Aug. 4, 1959

R. A. LOUKONEN 2,898,126

DRAFT HITCHES

Filed Jan. 30, 1956

ROY A. LOUKONEN
INVENTOR

HUEBNER, BEEHLER,
WORREL & HERZIG
ATTORNEYS

BY
Richard M. Worrel

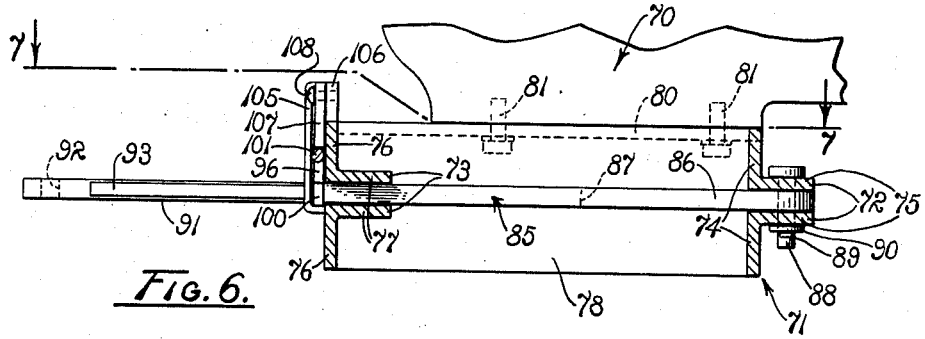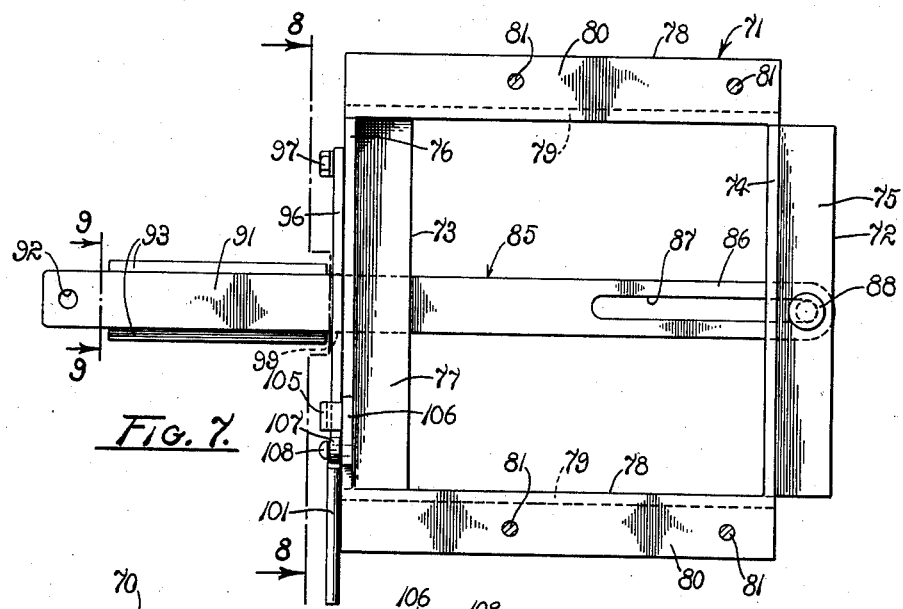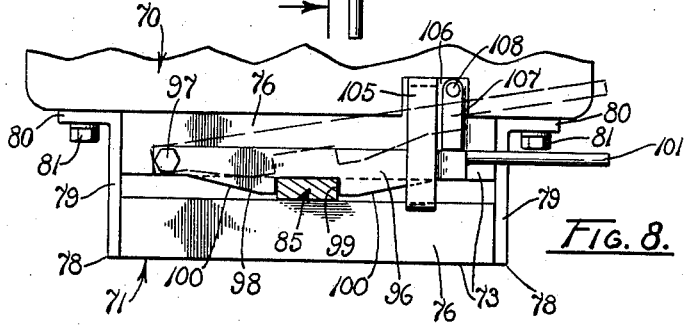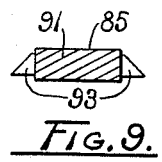

United States Patent Office 2,898,126
Patented Aug. 4, 1959

2,898,126

DRAFT HITCHES

Roy A. Loukonen, Parlier, Calif.

Application January 30, 1956, Serial No. 562,129

11 Claims. (Cl. 280—467)

The present invention relates to draft hitches and more particularly to an improved trailer and/or implement coupling adapted to interconnect draft and drawn appliances for earth traversing movement.

It has been conventional to provide tractors and other prime movers with horizontal drawbars to enable coupling of implements to the tractors. The actual connection of implements to drawbars is usually an inconvenient and aggravating task, especially when attempted by a single individual. In order to effect such connection, it is usually necessary to bring into registration a coupling aperture in the drawbar with a similar aperture in the tongue of the implement for insertion of a coupling pin therethrough. Unfortunately, heavy equipment like tractors and implements are not so precisely controlled as to make alignment of the apertures readily accomplished. Almost invariably when initially backing up to an implement, the drawbar of the tractor is found to be too far to the side, to the back or to the front, thus necessitating additional maneuvering of the tractor until exact registration is achieved. It is also a usual experience for the tractor to roll sufficiently to misalign the apertures while the operator descends from the tractor to effect the desired connection. While these difficulties are always onerous, they become a serious cause of wasted time and labor when frequent connection and disconnection operations are required, as in relaying wagons to continuously operated alfalfa choppers, threshing machines and the like.

Accordingly an object of the present invention is to provide an improved hitch for releasably interconnecting draft and drawn appliances and such appliances in train relation.

Another object is to facilitate connection of an implement and/or a trailer to a drawbar with a minimum of preliminary aligning requirements.

Another object is to provide for the relative universal adjustable movement of a drawbar of a draft appliance and a tongue of a drawn appliance so as to facilitate their interconnection without the necessity of moving the appliances to precisely desired ultimate relative positions.

Another object is to provide a hitch of the character described in which the drawbar automatically locks in predetermined draft position when drawn into such position by draft forces imposed thereon following connection to the tongue of the drawn appliance.

Another object is to provide a latch for a swingably and longitudinally movable drawbar which latch is adapted to lock the drawbar against movement and which operates automatically when a rearward drag is executed on the drawbar.

Another object is to provide a draft hitch which is simple and easy to make and use, economical to produce, sturdy and dependable in construction and operation, adapted to a variety of draft appliances and which is highly effective for accomplishing its intended purposes.

These and other objects will become more fully apparent upon reference to the following description.

In the drawings:

Fig. 1 is a side elevation of a draft hitch constructed in accordance with the principles of the present invention, having portions thereof cut away for illustrative convenience, connected to a draft appliance, such as a tractor, only fragmentarily illustrated, and further, having a pawl member shown in full lines in a latching position and in dashed lines in a retracted position.

Fig. 2 is a top plan view of the draft hitch of Fig. 1 with a portion of the tractor fragmentarily represented by dashed lines.

Fig. 3 is a somewhat enlarged fragmentary vertical section taken on line 3—3 of Fig. 1.

Fig. 4 is a somewhat enlarged fragmentary vertical section taken on line 4—4 of Fig. 1.

Fig. 5 is a somewhat enlarged fragmentary vertical section taken on line 5—5 of Fig. 1.

Fig. 6 is a side elevation of a second form of the present invention showing portions thereof in cross section and also shown connected to a fragmentarily illustrated tractor.

Fig. 7 is a horizontal section of the draft mechanism of Fig. 6 taken on line 7—7 of Fig. 6.

Fig. 8 is a vertical section taken on line 8—8 of Fig. 7 but including the tractor in fragmentary illustration.

Fig. 9 is a somewhat enlarged transverse section taken on line 9—9 of Fig. 7.

Referring more particularly to the drawings, a tractor 10 is fragmentarily indicated in Fig. 1 as having a rearward end 11 and undersurface 12. The tractor is intended to typify suitable prime movers generally and it is to be understood that the invention may be utilized with any draft appliance which may be employed for drawing or pulling an implement, trailer or other drawn appliance. In this connection, it should be observed that the hitches of the present invention are employed on drawn appliances rearwardly thereof in train relation. Thus, it is intended that "draft appliance" shall include any appliance which tows another appliance whether self powered or otherwise motivated.

A substantially U-shaped draft frame 15 includes a pair of channel-shaped side members 16 having forward ends secured to the tractor 10 by bolts 17 and rearward ends interconnected by an arcuate segment bar 18. The segment bar has a substantially horizontal flange 19 and an upwardly extended vertical flange 20, the latter preferably providing a plurality of longitudinally spaced apertures 21.

A U-shaped bracket 25 is secured in upright position to the undersurface 12 of the tractor 10 forwardly of the side members 16 by means of bolts 26. A pivot pin 27 is extended through the bracket upwardly toward, and preferably into a bore in the tractor and constitutes a substantially vertical pivot axis. It is to be noted at this point that the arcuate segment bar 18 is concentric to the pivot axis defined by the pin. An elongated drawbar 28 provides a forward mounting end 29 having an elongated longitudinally disposed slot 30 slidably receiving the pivot pin 27 for longitudinal slidable movement relative thereto and for pivotal or swingable movement therearound. The drawbar provides a rearward coupling end 31 having a bifurcated clevis 32 integral therewith which provides vertically aligned coupling apertures 33.

A substantially rectangular sleeve 38 is slidably received on the drawbar 28 and provides a forward flange 39 and a rearward flange 40 upwardly extended forwardly and rearwardly, respectively, of the segment bar 18. The flanges attached to the sleeve define a recess 41 therebetween fitted to the segment bar to enable guided movement of the sleeve longitudinally of the segment bar and permitting limited forward and rearward movement of the sleeve relative to the segment bar.

A roller 45 is mounted on the rearward flange 40 by means of a shaft 46 (Fig. 5) secured thereto by a nut 47 and suitable washers 48. The roller is axially radially disposed relative to the pivot axis defined by pivot pin 27, rests on the horizontal flange 19 for rolling movement therealong, and thus supports the sleeve 38 and rearward end 31 of the drawbar 28 on the draft frame 15. The roller provides a forwardly projected boss 49 adapted for reception selectively in the apertures 21 of the vertical flange 20 incident to relative movement of the sleeve and segment bar 18 toward each other. It will be apparent that when the boss is received in any one of the apertures 21, the drawbar is locked against swinging movement around the pin 27. To thrust the boss into an aperture, the sleeve 38 and elements borne thereby must be moved forwardly with respect to the arcuate bar 18. As will soon become apparent, this is accomplished when the device is preconditioned for the purpose, by backing the tractor with resistance on the drawbar so that the drawbar is moved forwardly and by means optionally employed thrusts the sleeve forwardly. This same result is attained if the drawbar is shoved forwardly by other causes, such as a drawn appliance shoving forwardly thereagainst in descending a hill.

A pawl or latch plate 55 provides a rearward end pivotally mounted on the drawbar 28 adjacent to the clevis 32 by means of a hinge 56. The pawl has a forward end providing a thrust bearing surface and a notch 57 wider than the nut 47 to enable pivotal movement of the pawl between a latching position substantially flat against the drawbar, as shown in full lines in Figs. 1 and 2, and an upwardly extended retracted position, as shown in dashed lines in Fig. 1. When the pawl is in latched position, all appreciable longitudinal movement of the drawbar 28 relative to the tractor 10 is precluded except to an extent sufficient to move the boss to and from engagement with the apertures 21. Such is readily effected by longitudinal movement of the drawbar 28 on which the sleeve 38 is held between the pawl 55 and stop 58. Thus if both the pawl and the boss 49 are in locking positions the drawbar is substantially rigid relative to the tractor. In order to withdraw the boss 49 from any aperture in which it may be engaged, a stop 58 is provided on the drawbar 28 in a position to engage the sleeve 38 just prior to the drawbar reaching its full rearward position, as permitted by the pin 27 in the slot 30. Thus, whenever the drawbar is moved to its rearward position, the boss is precluded from entering an aperture until the drawbar is again thrust forwardly with the pawl in lowered position. The stop 58 is preferably adjustable longitudinally of the drawbar and for this purpose the stop conveniently takes the form of a U bolt which transversely spans the drawbar and has downwardly extended legs on opposite sides thereof, a strap slidably mounted on the legs transversely below the drawbars, and nuts screw-threadably tightened upwardly on the legs against the strap.

A tongue 60 of an implement or trailer, not shown, is fragmentarily illustrated having a coupling aperture 61 therein, and a clevis pin 62 is slidably received through the apertures 33 of the clevis 32 and the aperture 61 in the tongue to effect interconnection of the tractor and trailer or implement.

*Operation*

The operation of the first form of the present invention is believed to be readily apparent and is briefly summarized at this point. In order to connect the tongue 60 to the tractor 10, the tractor is backed up to a position somewhat closer to the implement having the tongue than would normally be done. This positions the coupling apertures 33 of the drawbar 28 somewhat behind the coupling aperture 61 of the tongue 60.

The latch plate 55 is pivoted upwardly and the drawbar 28 is adjusted longitudinally relative to the tractor 10 and the tongue 60. This is permitted by provision of the elongated slot 30 which is guided in slidable movement by the pin 27 and the sleeve 38. The drawbar is also swung around the pivot pin 27 to aid in the juxtaposition of the apertures 33 and 61. The clevis pin 62 is then dropped through the aligned apertures. It is to be noted that the elongated slot 30 obviates the necessity of fore and aft adjustable movement of the tractor in an effort to bring the coupling apertures into registration. The present invention makes it possible to locate the correct position of the apertures merely by adjustments of the drawbar after only approximately locating the tractor in relation to the implement or trailer.

The tractor 10 may then be moved forwardly and when the pivot pin 27 engages the forward edge of the slot 30, draft is imparted to the implement through the drawbar 28. At this point the latch pawl 55 is usually pivoted downwardly to lock the drawbar in fixed longitudinal position on the tractor. By leaning the pawl 55 forwardly on the flange 40 before operating the tractor, the downward pivoting of the pawl to locked position is gravitationally automatically effected as soon as the drawber is pulled rearwardly. Complete swinging movement of the drawbar is still permitted inasmuch as the roller 45 is free to ride over the horizontal flange 19 of the segment bar 18. As the tractor is backed up with the pawl 55 in latching position, the segment bar 18 moves rearwardly relative to the sleeve 38 which is now held against movement along the drawbar 28 by abutment with the pawl 55. Thus the boss 49 on the roller 45 is forced into the first aperture 21 with which it is aligned during rearward movement of the tractor. This enables directional control of the implement during rearward travel of the tractor or forward travel of the implement relative to the tractor and prevents folding or jack-knifing of the implement against the tractor incident to drawbar pivoting action.

*Second form*

The second form of the present invention includes a tractor 70 fragmentarily illustrated in a manner similar to the tractor 10 of Fig. 1. A substantially rectangular draft frame 71 provides a pair of forward angle bars 72 and a pair of rearward angle bars 73. The forward angle bars provide a pair of substantially vertical flanges 74 in substantially the same plane and a pair of spaced horizontal flanges 75. The rearward angle bars likewise provide vertical flanges 76 and horizontal flanges 77. Side angle bars 78 provide pendent vertical flanges 79 secured, as by welding, to opposite outer edges of the vertical flanges of the forward and rearward angle bars and horizontal flanges 80 rigidly secured to the tractor by means of bolts 81 or other suitable means.

An elongated drawbar 85 is fitted between the horizontal flanges 75 and 77 of the draft frame 71 and provides a forward end 86 having an elongated slot 87 longitudinally thereof. A pivot pin 88 is extended through the horizontal flanges 75 of the forward angle bars 72, is received in the slot 87, and is secured in position by means of a cotter pin 89. A washer 90 is preferably located between the lower flange 75 and the cotter pin. The drawbar has a rearward end 91 providing a coupling aperture 92 and a pair of laterally disposed, longitudinally extended, triangularly shaped latching ledges 93. While ledges transversely of triangular form are desirable, other transverse shapes are suited to the purpose. It is to be noted that the ledges provide forward ends which terminate rearwardly of the rear angle bars 73 when the drawbar is in its rearwardmost position.

A latch bar 96 is pivotally connected to the upper vertical flange 76 of the rear angle bar 73 by means of a pin 97 and provides a lower edge 98 having a central notch 99 and inclined camming portions 100 on opposite sides of the notch. The latch bar also preferably has an outwardly extended handle portion 101. The notch is wide enough to receive the drawbar 85 in fitted relation therein but not sufficiently wide to permit slidable movement of the ledges 93 therethrough. The latch bar is adapted for pivotal movement between a latching position fitted over the drawbar forwardly of the ledges 93 and an upper position retracted therefrom, shown in dashed lines in Fig. 8.

A bracket or U-shaped strap 105 provides opposite ends connected respectively to the lower vertical flange 76 of the rear angle bar 73 and an extension 106 of the upper vertical flange 76. The latch bar 96 is extended through the strap which limits and guides movement of the bar and resists rearward drag on the latch bar which would otherwise place excessive strain on the pin 97. A detent 107 is pivotally connected to the extension 106 by means of a pin 108 and is adapted for movement into engagement with the latch bar when the latter is in a latching position. The detent is pivotally retractable counterclockwise upwardly from the latch bar, as viewed in Fig. 8, to permit intentional raising of the latch bar to the position shown in dashed lines in Fig. 8 and when released is pendently supported with a lower end thereof engaged with the latch bar in substantial vertical alignment with the pin 108 to resist inadvertent upward pivotal movement of the latch bar.

*Operation of second form*

The operation of the second form of the present invention is similar in principle to the first form. Thus in connecting an implement to the tractor 70, the tractor is positioned more closely to the implement than ordinarily is done. The latch bar 96 is then pivoted upwardly after releasing the detent 107 and the drawbar 85 is then adjusted longitudinally relative to the pin 88 and pivotally thereabout to effect registration of the coupling aperture 92 with the coupling aperture of the tongue of the implement to which connection is being made.

In order to lock the drawbar 85 against both swinging and longitudinal movement, the drawbar is placed in a central position, as shown in Fig. 7, moved to its rearwardmost position, and the latch bar 96 is lowered to permit the notch 99 to fit over the drawbar. This is normally automatically accomplished simply by driving the tractor forwardly after connection of the rear end of the drawbar to an implement or the like. In this position the latch bar is interposed the rearward angle bars 73 and the ledges 93 of the drawbar and thus the latch bar provides a thrust bearing surface engaging the ledges. Since the latching ledges cannot pass through the notch, longitudinal movement of the drawbar is prevented. Further, the capture of the drawbar in the notch prevents swinging movement of the drawbar. The detent 107 is pivoted downwardly to abut the upper edge of the latch bar thereby to lock the latter in latching position.

The second form of the invention operates automatically, when desired, to lock the drawbar 85 in position. Thus, after an implement has been connected to the drawbar, and assuming the drawbar to be in an angular position displaced from the central position shown in Fig. 7, the tractor 70 is driven forwardly. As the tractor is moved in a forward path, the drawbar 85 and the implement tend to move toward the center of the frame 71 in alignment with the line of travel of the tractor. In moving toward this central position, the drawbar slides along the corresponding camming portion 100 of the lower edge 98 of the latch bar 96. In this manner the drawbar is guided toward the notch 99 and eventually the notch drops over the drawbar and the detent gravitationally descends thereby locking the drawbar in position.

It will be apparent from the foregoing that several highly effective hitch structures have been provided for expeditiously connecting a tractor or other draft appliances and implements, trailers or other drawn appliances. No longer is the precise relative positioning of draft and drawn appliances required. With only approximate relative positioning, the hitches of the present invention immediately accommodate reasonable extents of misalignment and variations in spacing of the appliances. Connection is promptly made without any tedious and time consuming re-positioning of the draft appliance. Furthermore, although the hitches are displaceable for connecting purposes, they are automatically returned and latched in operable position without further attention of any kind by an attendant.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A draft hitch adapted for connection to a draft appliance comprising a substantially vertical pivot pin mounted on the prime mover defining an erect pivot axis, a substantially horizontal arcuate segment bar mounted on the draft appliance in concentric horizontally spaced relation to the pivot pin, an elongated drawbar having an end providing an elongated longitudinal slot slidably pivotally received on the pivot pin and an opposite coupling end extended beneath the segment bar, said slot having closed opposite ends predetermining forwardmost and rearwardmost positions of the drawbar on the pin, a sleeve slidably fitted on the drawbar intermediate its ends, flanges upwardly extended from the sleeve on opposite sides of the segment bar, a roller mounted on one of said flanges for rotation and rested on the segment bar for rolling movement therealong during pivotal movement of the drawbar, and automatic means for releasably retaining the drawbar in rearwardmost position relative to the pivot pin.

2. A draft hitch adapted for connection to a draft appliance having a rearward end comprising an erect pin downwardly extended from the draft appliance and constituting a pivot axis, a draft frame including side members rearwardly extended from the prime mover and a rear segment bar interconnecting the side members and being substantially concentric to the pin, the segment bar having a substantially horizontal flange and an upright flange providing a plurality of longitudinally spaced apertures, an elongated drawbar having a forward end providing an elongated longitudinal slot slidably receiving the pin and a rearward coupling end rearwardly extended beneath the draft frame, a sleeve slidably received on the drawbar, front and rear flanges upwardly extended from the sleeve forwardly and rearwardly of the segment bar respectively to guide movement of the sleeve longitudinally of the segment bar and permitting only limited forward and rearward movement of the sleeve relative to the segment bar, a roller forwardly extended from the rear flange and rested on the horizontal flange of the segment bar for rolling movement therealong, the roller having a forwardly extended locking boss adapted for reception in the apertures of the upright flange of the segment bar incident to limited relative movement of the sleeve and its flanges forwardly on the segment bar.

3. A draft hitch for a draft appliance having forward and rearward ends and an undersurface comprising a pivot downwardly extended from the undersurface of the tractor defining a substantially vertical pivot axis; a horizontally disposed draft frame rearwardly extended from the pivot pin including a substantially horizontal arcuate segment bar concentric to said pivot axis having a horizontal flange and a vertical flange, the vertical flange having a plurality of apertures longitudinally spaced therealong; a mounting member positioned below the frame having front and rear flanges upwardly extended forwardly and rearwardly of the segment bar for guided movement longitudinally thereof and for limited forward and rearward movement relative thereto and having a sleeve portion below the bar radially disposed relative to said pivot axis; a roller having a substantially horizontal axis radially disposed relative to said pivot axis mounted on the rear flange of the mounting member above the horizontal flange of the segment bar for rolling movement therealong and having a forwardly extended boss releasably receivable in the apertures of the segment bar incident to forward movement of the mounting member relative to the segment bar; an elongated longitudinally disposed slot fitted on the pivot pin, and a rearward end slidably extended through the sleeve portion of the mounting member and adapted for coupling to an implement to be drawn; and a pawl pivotally connected to the drawbar rearwardly of the mounting member pivotal between a position against the drawbar engageable with the sleeve to limit forward movement of the drawbar relative to the mounting member and a position upwardly retracted therefrom.

4. In association with a draft appliance having a rearward end portion, a draft hitch comprising a draft frame mounted on the rearward end portion of the draft appliance, a substantially erect pin mounted on the draft appliance, an elongated drawbar providing an elongated longitudinal slot slidably fitted on the pin for longitudinal slidable movement of the drawbar between predetermined forward and rearward positions relative to the draft appliance and a rearward coupling end extended rearwardly of the draft frame, first latching means mounted on the draft frame and slidably fitted on the drawbar, and second latching means mounted on the drawbar, one of said latching means being pivotally mounted for movement between a latching position engaging the other latching means in the rearward position of the drawbar for preventing said longitudinal slidable movement of the drawbar and a retracted position permitting said slidable movement of the drawbar, said first and second latching means providing flat opposed substantially parallel thrust bearing surfaces extended transversely substantially the full width of the drawbar and engageably mating in said latching position.

5. The draft hitch of claim 4 wherein said second latching means includes a ledge rigidly outwardly extended from the coupling end of the drawbar in longitudinally spaced relation to the slot, and wherein said first latching means is a latch bar pivotally mounted on the draft frame, having a notch therein, and being pivotal between a locking position interposed between said ledge and the draft frame with the notch fitted over the drawbar and a position with the notch retracted from the drawbar.

6. The draft hitch of claim 4 including a pair of vertically spaced horizontally positioned guide members mounted on the draft frame in spaced relation to the pin, the coupling end of the drawbar being slidably extended between the guide members, said second latching means including ledges rigidly outwardly extended from the coupling end of the drawbar, and said first latching means being a latch bar pivotally mounted on one of the guide members, having a notch therein, and being pivotal between a locking position interposed between the ledges and the guide members with the notch fitted over the drawbar and a position retracted from between the guide members and the ledges.

7. The draft hitch of claim 4 including upper and lower horizontal angle bars mounted on the draft appliance in rearwardly spaced relation to the pin having substantially horizontal flanges in vertically spaced relation and substantially vertical flanges lying in substantially vertical alignment, the rearward coupling end of the drawbar being slidably extended between the horizontal flanges of the angle bars and provided with ledges laterally extended therefrom on the opposite side of the angle bars from the pin and constituting said second latching means, said first latching means being a latch bar pivotally mounted on the upper angle bar, having a lower edge providing a central notch, and having camming portions on opposite sides of the notch, said notch having a width greater than the width of the drawbar but less than the maximum spacing between the ledges, the latch bar being movable between a latching position interposed between the ledges and the angle bar with the notch fitted over the drawbar, and a retracted position; and including a detent pivotally mounted on the upper angle bar for movement into releasable engagement with the latch bar when in latching position.

8. The draft hitch of claim 4 including a pair of vertically spaced horizontally positioned guide members mounted on the draft appliance in spaced relation to the pin, the rearward coupling end of the drawbar being longitudinally slidably received between the guide members, said second latching means including a ledge rigidly outwardly extended from the coupling end of the drawbar in spaced relation to the guide members in the rearward position of the drawbar, and said first latching means being a latch bar pivotally mounted on one of the guide members, having a notch therein, and being pivotal between a locking position interposed between the ledge and the guide members with the notch fitted over the drawbar to preclude longitudinal movement of the drawbar, and a retracted position withdrawn from between the guide members and the ledge.

9. In association with a draft appliance having a rearward end portion, a draft hitch for coupling an implement to the appliance comprising a draft frame mounted on the rearward end portion of the draft appliance, a substantially erect pin mounted on the draft appliance, an elongated drawbar having a forward end providing an elongated longitudinal slot slidably fitted on the pin for longitudinal slidable movement of the drawbar between predetermined forward and rearward positions relative to the draft appliance and a rearward coupling end extended rearwardly of the draft frame, first latching means mounted on the draft frame slidably fitted on the drawbar, and second latching means mounted on the drawbar, one of said latching means having a flat substantially vertical thrust bearing surface disposed transversely of the drawbar, the other of said latching means being a plate having a flat substantially vertical thrust bearing surface disposed transversely of the drawbar and mounted for pivotal movement around a substantially horizontal axis between a latching position with said thrust bearing surface in opposed abutment when in the rearward limiting position of the drawbar for preventing said slidable movement of the drawbar and for bearing thrusts incident to relative forward and rearward movement of the appliance and the implement, and a retracted position permitting said slidable movement.

10. In association with a draft appliance having a rearward end portion and being mounted for earth traversing movement, a draft hitch comprising a drawbar supporting member extended transversely of the direction of movement of and rigidly mounted on the draft appliance, a substantially erect pin mounted on the draft appliance forwardly of the supporting member, an elongated drawbar extended transversely of the supporting member having a forwardly extending portion providing an elongated longitudinal slot slidably fitted on the pin for longitudinal slidable movement of the drawbar between predetermined forward and rearward positions relative to the draft appliance and a rearwardly extended portion adapted for connection to a drawn appliance, a first latching member mounted on the drawbar and extended longitudinally thereof, and a second latching member mounted on the supporting member and slidably fitted on the drawbar, one of the latching members being mounted for pivotal movement around a substantially horizontal axis between a latching position with the second latching member interposed the first latching member and the drawbar supporting member in said predetermined rearward position of the drawbar to preclude said longitudinal slidable movement of the drawbar, and a retracted position permitting such slidable movement, said one latching member being automatically gravitationally urged into latching position incident to movement of the drawbar into said rearward position said latching members and drawbar supporting members having substantially flat upstanding surfaces extended transversely of the drawbar and being engageable in said latching position.

11. In association with a draft appliance having a rearward end portion, a draft hitch comprising a draft frame mounted on the appliance, a substantially erect pin mounted on the draft appliance forwardly of the draft frame, an elongated drawbar having a forward end providing an elongated longitudinal slot slidable fitted on the pin for longitudinal slidable movement of the drawbar between predetermined forward and rearward positions relative to the draft appliance and a rearward coupling end extended rearwardly across the draft frame, a sleeve supported on the draft frame slidably receiving the drawbar, and a latch plate having a forward thrust bearing surface and being pivotally mounted on the drawbar adjacent to the coupling end for pivotal movement around a substantially horizontal axis transversely of the drawbar between a latching position rested against the drawbar with said bearing surface extended transversely of the drawbar and engageable with the sleeve for preventing said longitudinal slidable movement of the drawbar, and an upwardly retracted position permitting said longitudinal slidable movement of the drawbar.

References Cited in the file of this patent

UNITED STATES PATENTS

| 793,787 | Hesser | July 4, 1905 |
| 1,830,874 | Hendrickson | Nov. 10, 1931 |
| 2,678,222 | Payzant | May 11, 1954 |

FOREIGN PATENTS

| 354,052 | Germany | May 29, 1922 |
| 492,300 | Germany | Mar. 1, 1930 |
| 547,952 | Germany | Apr. 6, 1932 |